(12) United States Patent
Jordil et al.

(10) Patent No.: US 10,107,618 B2
(45) Date of Patent: Oct. 23, 2018

(54) COORDINATE MEASURING MACHINE (71) Applicant: HEXAGON TECHNOLOGY CENTER GMBH, Heerbrugg (CH)

(72) Inventors: Pascal Jordil, Ecoteaux (CH); Bo Pettersson, London (GB); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 527 days.

(21) Appl. No.: 14/427,280

(22) PCT Filed: Sep. 9, 2013

(86) PCT No.: PCT/EP2013/068563
§ 371 (c)(1),
(2) Date: Mar. 10, 2015

(87) PCT Pub. No.: WO2014/040937
PCT Pub. Date: Mar. 20, 2014

(65) Prior Publication Data
US 2015/0241203 A1    Aug. 27, 2015

(30) Foreign Application Priority Data
Sep. 11, 2012 (EP) ..................... 12183806

(51) Int. Cl.
*G01C 3/08*     (2006.01)
*G01B 11/00*    (2006.01)
(Continued)

(52) U.S. Cl.
CPC .......... *G01B 11/005* (2013.01); *B25J 9/1623* (2013.01); *B25J 9/1697* (2013.01); *G01B 5/0004* (2013.01); *G05B 2219/39052* (2013.01)

(58) Field of Classification Search
CPC ..... B25J 9/1623; B25J 9/1687; G01B 11/005; G01B 5/0004; G05B 2219/39052
(Continued)

(56) References Cited

U.S. PATENT DOCUMENTS 7,395,136 B2 * 7/2008 Osten ................. B25J 9/1623
                                                700/245
8,806,974 B2   9/2014 Helmer et al.
(Continued)

FOREIGN PATENT DOCUMENTS

CN          1526514 A    9/2004
CN        101180163 A    5/2008
(Continued)

OTHER PUBLICATIONS

European Search Report dated Dec. 6, 2012 as received in Application No. 12 18 3806.
(Continued)

*Primary Examiner* — Mark Hellner
(74) *Attorney, Agent, or Firm* — Maschoff Brennan (57) ABSTRACT

A coordinate measuring machine CMM and a method for gauging a target object by means of said CMM. The CMM comprises a Delta Robot as a support structure having an end effector movable within a motion zone, a tool-holder fixed to the end effector configured to accommodate various measurement probes and especially a camera, wherein the camera comprising an optics having a field of view encompassing maximum 20% of a motion zone of the end effector. Further it comprises a control unit controlling the motion of the end effector within the motion zone and the motion of the measurement probe over a target object in an "on the fly"-mode. Further it comprises an analyzing unit for processing electronic signals and/or data delivered by the measurement probe. The analyzing unit comprises espe-
(Continued)

cially storage means for storing said images and comprising a circuit unit for processing said images.

23 Claims, 5 Drawing Sheets (51) Int. Cl.
  *B25J 9/16* (2006.01)
  *G01B 5/00* (2006.01)
(58) Field of Classification Search
  USPC .......................................................... 356/4.01
  See application file for complete search history.

(56) References Cited

U.S. PATENT DOCUMENTS

2011/0046917 A1   2/2011  Lippuner et al.
2011/0132131 A1*  6/2011  Worz .................... B25J 9/1623
                                                    74/490.05

FOREIGN PATENT DOCUMENTS

CN     201680825 U     12/2010
CN     102012211 A      4/2011
EP       2283311 B      8/2011
WO    2008/135530 A1   11/2008

OTHER PUBLICATIONS

Daney et al., "Interval method for calibration of parallel robots: Vision-based experiments", Science direct, Mechanism and Machine Theory, vol. 41, 2006, pp. 929-944.
Sebastian et al., "Parallel Robot High Speed Object Tracking", Image Analysis and Recognition, Lecture Notes in Computer Science, vol. 4633, 2007, pp. 295-306.
Traslosheros et al., "New visual Servoing control strategies in tracking tasks using a PKM", Mechatronic Systems Simulation Modeling and Control, Mar. 1, 2010, pp. 1-32.
Zuo et al., "Stereo vision guided control of a Stewart platform", Proceedings of the 2002 IEEE International Symposium on Intelligent Control, 2002, pp. 125-130.
Equator 300 Mess-Systeme, Renishaw, 2 pages, Jul. 2011.

* cited by examiner

COORDINATE MEASURING MACHINE

FIELD OF THE INVENTION

The present invention relates to a coordinate measuring machine, and a method for gauging a target object by using such a coordinate measuring machine.

BACKGROUND

Usually a coordinate measuring machine (short CMM) has a tactile probe or an optical probe for gauging the surface of a target object. The optical or tactile probe is movable fixed at an articulated arm, as it is shown for a tactile probe i.e. in EP 2283311 A1, or at a portal, as it is shown for an optical probe i.e. in WO 2008/135530 A1, so that it can be moved over the surface of the target object. In order to prepare such a measurement the CMM usually has to be calibrated by means of a reference object and a program has to be written defining the trajectories for the measurement probes. Immediately before a measurement can be started it has to be checked whether the target object is fixed properly in the correct position and whether there are any obstacles in pathways of the measurement probe. That means that beside the measurement itself a time consuming calibration has to be done before measuring and only specially trained users can carry out the measuring.

In industry measurement times are considered as unproductive times as no salable components are produced during this period. The measurement task therefore has to be done as quickly as possible. Thus, high measurement speed and short preparation times, including a quick fixation of the object to be gauged and a short calibration time for the CMM, is of high commercial importance. In this context it is understandable that not only the maximum moving speed of the measurement probe relative to the target object is of interest, which is mainly important for large components and long distances to be traveled by the measurement probe, but also the maximum acceleration and deceleration, which is important for small work pieces as it allows a very fast positioning of the measurement probe on the interesting positions relative to the target object.

Therefore, several measures have been taken during the past to increase the measurement speed. E.g. measuring with an optical probe instead of a tactile probe in general can increase the measurement rate and avoid abrasion effects at the surface of the target object.

Another option to increase measurement rate is the use of a camera as a measurement probe and using this camera in an "on the fly"-mode, as it is described in WO 2008/135530 A1. During the "on the fly"-measurement mode the camera is moved continuously over the target object and takes pictures only at the interesting positions without stopping there. The position data for each image is delivered from the position encoders and stored together with the according image. A flash light illumination of the interesting positions ensures a sharp picture in spite of the moving speed of the camera. As the camera is not stopped at the interesting positions, less deceleration and acceleration actions have to be carried out which decreases measuring time. However, in order to know the interesting positions and in order to move the camera along optimized trajectories including all interesting positions calibration of the CMM usually on the basis of a reference object is necessary and a subsequent programming of the trajectories including the defined interesting positions, where pictures should be taken.

However, using a normal, cost-efficient camera with a standard sized optics shows a small field of view, when used with the magnification adequate to reach the necessary accuracy. As the field of view is small, it is necessary to take a lot of images, which means a lot of movements of the camera in order to see all features of interest. Thus, the throughput of a commercial CMM with an articulated arm or a portal structure—independent of using it with or without an "on the fly"-mode—is still non-satisfying caused by its low speed and low acceleration. In order to encounter this unsatisfying situation nowadays many CMMs are offered with cameras provided with objectives of larger diameter, showing a larger field of view for the same magnification. As a result no movements are necessary to measure small target objects and only a few movements and a few images are necessary for encompassing a large target object. However, those CMMs are expensive, as the price for cameras with such a large objective is high.

The latest development tries to increase the measurement rate by using a so called Delta Robot instead of a portal machine or an articulated arm for moving a tactile measurement probe (brochure "Equator 300 Mess-Systeme" of Renishaw, published in July 2011).

A Delta Robot is a type of parallel robot. It comprises a stationary base fixed at a stationary frame, which is mounted above a workspace, and three middle jointed arms extending from the base. The arms, often called kinematic chains, are connected with their first end to the base by means of universal joints and connected with their second end to an end effector often built in form of a triangular or circular platform. The arms are made of lightweight composite material and are driven by actuators located in the base. Driven by the actuators the end effector is movable within a motion zone. The motion zone is the 3-dimensional space the end effector is maximally movable in. The boundaries of the maximum movement—and by that of the motion zone—are defined by the construction of the cinematic chains and the resulting physically limits of their common motion as being linked by the end effector. Actuation can be done with linear or rotational actuators. As the arms are made of a light composite material the moving parts of the delta robot have a small inertia. This allows for very high accelerations and very fast movement, which outclasses by far those realizable by a portal machine or an articulated arm. The key design feature of a Delta Robot is the use of parallelograms in the arms, which maintains the orientation of the end effector by restricting the movement of the end effector to pure translation (movement only with 3 degrees of freedom (3DOF: translation in the x-, y- or z-direction). Nowadays in industry Delta Robots are mainly used for gripping and placing items, wherein the gripper is arranged at the end effector. The movement of the end effector and precise gripping and placing of items is controlled by a main controller getting feedback information of the actuators and of angle encoders connected to the joints of the arms often named position encoders. A trajectory of the end effector from a position an item has to be gripped to a position where the item has to be placed is stored in the main controller. During operation the main controller controls the actuators of the arms in a way that the end effector follows the programmed trajectory.

In a further development machines based on a Delta Robot structure had been created. Thereby the degree of freedom (DOE) of the Delta Robot had been extended up to 6, allowing the end effector lateral movements in Cartesian directions x, y, z and rotational movements around those axis resulting in yawing, rolling, pitching. Because of their high acceleration/deceleration actions and their high movement speed Delta Robots and machines based on a Delta Robot are popular for picking and packaging in factories of the packaging industry, medical and pharmaceutical industry; some executing up to 300 picks per minute. Other possible applications include assembly tasks or operation in clean rooms for electronic components as well as haptic interfaces controlling medical or industrial robotic systems for enabling human operators to operate instinctively and safely critical systems.

But in spite of its applicability in various technical fields, Delta Robots have been found so far not suitable for measurement requirements. This is because of their sensitivity to temperature fluctuation and strong vibration during fast movement and fast acceleration/deceleration actions, caused by their lightweight construction. As a result, the exact position of the end effector can not be determined precisely enough and adequate focusing with optical means, e.g. an optical probe for a CMM or a camera, is not possible.

The usage of a Delta Robot for moving a tactile probe of a CMM, as it is proposed in the brochure "Equator 300 Mess-Systeme" of Renishaw, is therefore not in contradiction to the statement above, but considers these problems of Delta Robots by using a tactile measurement probe. As the tactile probe has to contact the surface of the target object, the tactile probe dictates the measurement speed, which is much slower than what the Delta Robot would allow. Thus, the measurement rate is limited by the tactile probe anyway and determination of its position will thus be able. However, the possibilities the delta structure provides with respect to acceleration and motion speed is not fully exploited. Further, the CMM disclosed in this brochure is again only be able to measure the target object with reference to a reference object, which has to be measured before the target object of a series production can be measured. That means it has to be calibrated before the measurement. So, no cut down of measurement time is possible during preparation of the measurement and only special trained persons will be able to handle this CMM.

SUMMARY

Some embodiments of the presented invention include a coordinate measuring machine which is user-friendly, reasonably priced and very fast.

A coordinate measuring machine (CMM) presented here comprises a Delta Robot as a support structure. The Delta Robot having an end effector at the free end of its kinematic chains movable within a motion zone. Wherein the motion zone is the volume the end effector can be moved in maximally and the maximum movement of the end effector is limited by the construction of the kinematic chains and their interaction as being linked by the end effector. A tool-holder fixed to the end effector is configured to accommodate various measurement probes. The measurement probe is movable by means of the end effector within the motion zone over a target object, wherein the motion of the end effector is controlled by a control unit. An analysing unit of the CMM is configured for processing electronic signals and/or data delivered by the measurement probe. According to the invention the measurement probe is a camera. Thus, signals or data delivered by the measurement probe are images taken by said camera, wherein the camera comprising an optics having a field of view encompassing maximum 20% of the motion zone. The analysing unit comprises storage means for storing said images and comprises a circuit unit for processing said images. The control system is configured to move the camera over the target object in an "on the fly"-mode.

As mentioned before "on the fly"-mode is used within this application in the sense as it is described in more detail in WO 2008/135530 A1. Thus, "on the fly"-mode means that the camera is moved continuously over the target object and takes pictures only at positions of interest and the pictures are taken without stopping at those positions of interest. The position data for each image is detected and stored together with the according image. If necessary a flash light illumination of the interesting positions ensures a sharp picture in spite of the moving speed of the camera. As the camera is not stopped at the interesting positions, less deceleration and acceleration actions have to be carried out, so that the measuring time is decreased considerably.

The camera having a field of view of maximum 20% of the motion zone means that, if the end effector is at a boundary position of the motion zone and the camera fixed at the end effector takes a view through the motion zone to a boundary at the most outranged other side of the motion zone, the field of view of the camera encompasses maximum 20% of a projection of the motion zone onto an area, i.e. on an image taken from the motion zone by said camera from said perspective. That means, in case the camera is moved over the target object at one end of the motion zone, i.e. near a stationary base of the delta structure, where the kinematic chains are fixed on, and the target object is fixed at a side of the motion zone vis-à-vis to stationary base the camera encompasses maximum 20% of a projection of the target object on an area, i.e. on an image, and encompasses accordingly less if its moved over the target object more closely. As the camera has optics with a field of view encompassing maximum 20% of the motion zone, the camera can be built with a very low inertial mass and can deliver images of high quality. Further such a camera is cost-efficient and therefore the whole CMM can reasonable be priced. The combination of a Delta Robot as a support structure with such a camera and a control unit configured for moving the camera in an "on the fly"-mode allows a high speed movement and high acceleration and deceleration actions of the camera. Thus, large target objects can be measured very quickly thanks to high speed movement; small target object can be measured very fast as well, thanks to the high acceleration/deceleration actions that allows for occurring the many changes in movement direction rapidly.

As it is known in the state of the art the CMM is provided with output means in form of a display or monitor and optionally a loud speaker for acoustic warning connected to the analysing unit for presenting the results to the user. Further as known there is an input means for enabling the user to manipulate the CMM. Those means can be integrated in the CMM as presented here e.g. in the stationary base or they can be built as an external unit or integrated in a computer that is connected to the CMM by wire or wireless in well known manner.

In a preferred embodiment the circuit of the analysing unit is configured to generate a realistic sight of the target object, which already has or had been gauged or is currently being gauged by the camera. That means the analysing unit is capable for carrying out image processing after gauging is accomplished or during gauging. The information content of the realistic sight is selectable by the user. The circuit thereby generates the realistic sight with the selected information content by means of adding the according information of the images in an overlapping or handshaking way. Creating a realistic sight of the gauged target object only considering the selected information reduces processing time for processing the images delivered from the camera.

Thus, generating a realistic sight of the object or of an interesting part of the object with the desired information means that an image is generated by processing the desired information of usually a lot of pictures but at least two pictures taken by the camera, so that said generated image shows the whole object or at least a bigger part of the object than what was captured by one picture taken by the camera. Knowing the chosen information said realistic sight image allows the user to recognize the object or chosen part of the object rapidly as the generated realistic sight image shows more than only the detail a single image taken by the camera would show.

In a further preferred embodiment the camera is a high speed camera being able to take pictures/images very fast, that means with more than 360 frames per second (fps), wherein the illumination of the target object is ensured by a light source configured for illuminating the object in a stroboscopic way at each time a picture is taken. The stroboscopic illumination ensures sharp images in spite of the fast movement of the camera.

The light source is part of the CMM and can be arranged in a way that the part of the target object, from which a picture should be taken by the camera, is illuminated from the side the camera looks at it or—in case only the contour of the object is of interest—from behind the object. In an even more preferred embodiment the light source is arranged at the end effector together with the camera.

The camera in particular is controlled in a way for taking pictures with a high clock rate, e.g. with 500 fps or more, and the stroboscopic illumination is coordinated with this clock rate, so that the target object is illuminated each time a picture is taken. The clock rate is preferably adaptable to the current speed of the camera motion and to the field of view of the camera, so that the analysing unit is able to create a realistic sight out of the according information of the taken images by overlapping or handshaking without having to many images and by that increasing processing time and without having not enough images for handshaking/overlapping.

Taking pictures with a defined clock rate, corresponding to the moving rate of the camera over the target object, allows gauging the target object with routine trajectories instead of individually programmed moving paths, which enables even untrained users to handle the CMM and decreases the time needed for the measurement. Further no reference object has to be measured before measuring the target object and thus, no time for calibration is needed.

The Delta Robot of the CMM has as usual a stationary base fixed at a stationary frame and comprises kinematic chains, which are middle jointed arms, that means a first part of the arm is jointed to a second part of the arm by a joint. The arms are connected by joints with their first parts to the stationary base and with their second parts by joints to the end effector. As usual, the joints can be provided with angle encoders, also called position sensors, in order to deliver according angle signals, so that the current position of the end effector with the camera can be derived and used by the analysing unit and the control unit.

In a preferred embodiment the end effector supports a sensor unit, wherein the sensor unit comprises multi axis acceleration sensors measuring acceleration and deceleration of the measurement probe in direction of the horizontal x-axis and/or the horizontal y-axis and/or the vertical z-axis. Using the signals of these acceleration sensors, allows determining the current position of the camera more precisely by eliminating to a great extend vibration effects.

Another option is to provide tilt sensors for the horizontal x-axis and y-axis in the sensor unit of the end effector in order to determine the current position of the camera more precisely.

A gyroscope in form of a gyrostat, MEMS (Micro Electro-Mechanical System), VSG (Vibrating Structure Gyroscope) or other known embodiments can be integrated in the sensor unit.

In a preferred embodiment an IMU (Inertial Measurement Unit) integrating accelerometers and gyroscopes and optionally magnetometers is included in the sensor unit.

Still another option to determine the position of the camera at the end effector more precisely is, to provide the CMM with a global surveillance system. The global surveillance system comprises at least one stationary camera and at least one marking in the region of the end effector, wherein region of the end effector comprises the end effector and/or the tool-holder and/or the camera. The marking and the stationary camera of the global surveillance system are arranged relative to one another in a way that the marking is visible by the stationary camera during at least 80% of the measuring time. Using this global surveillance system eliminates to a great extend impreciseness caused by mechanical clearances, e.g. in the joints, the influence of temperature fluctuations and spring effects of the light weight construction of the Delta Robot combined with the fast movement and acceleration/deceleration actions. This is because the data delivered by the global surveillance system are reflecting the Delta Robot and the position of the camera at the end effector of the Delta Robot from an outside perspective instead of being part of the Delta Robot like the angle encoders and/or the sensor unit.

The easiest way to arrange the stationary camera of the global surveillance system is fixing the stationary camera at the stationary base or the stationary frame of the Delta Robot. The stationary frame thereby is constructed in a relative massive way with a high moment of inertia, so that the movement of the kinematic chains with the end effector and the measurement probe does not have any impact on the stationary frame.

In a preferred embodiment of the global surveillance system of the CMM there are two stationary cameras for enabling a stereo view. The stationary cameras can have a field of few encompassing the whole motion zone of the end effector and by that the whole volume occupied by the target object in this zone. Thus cameras having a field of view of 100% or more of the motion zone are usable, but usually more expensive as cameras having a smaller field view. Therefore cameras with a smaller field of view, in the range of 60% up to 80% of the filed of view, are sufficient and allows decreasing the costs.

Generally in this application the expression "camera having a field of view encompassing the motion zone in the amount of a certain percentage" means of course that a projection of the motion zone onto an area, especially onto a picture/image taken by said camera, is encompassed to said certain percentage by the field of view of said camera.

Even more preferred are global surveillance systems having three stationary cameras or even more, wherein the field of view of each stationary camera may even be smaller than the above mentioned 60% of the motion zone, e.g. 30% to 40% of the motion zone of the end effector. Three and more cameras can better ensure that the marking(s) are always visible during the measurement at least by one camera. However, too many stationary cameras increase the data to be processed for determining the position and therefore an optimisation between number of cameras and data processing time has to be found. The field of view of the cameras should be overlapping in the centre of the motion zone or one camera is focused on the centre region of the motion zone and is overlapping with the fields of view of the "outer" cameras arranged with their fields of view equally around the field of view of the "centre" camera.

The number of markings is at least one but better two, more preferred three, seven or ten, wherein markings of the global surveillance system can be arranged not only in the region of the end effector, which is at the end effector and/or at the tool-holder and/or at the camera but can also be arranged in the region of the second parts of the arms.

The markings should be arranged in such a distance to each other that they are well distinguishable on the pictures taken by the camera(s).

Further, the markings of the global surveillance system should be amply dimensioned, so that they are well visible in the pictures taken. That means a marking should be represented by more than one pixel better four or nine pixels or even more pixels depending on the resolution. However, the dimension of the markings must ensure that they are recognizable at the pictures and their existence or non-existence/disappearance from one picture to the following picture should be unambiguously determinable.

In general it can be stated that the more markings are arranged, the more accurate and less ambiguous is the position, to be determined, but often the number of markings are limited by space. However, the more cameras, the fewer markings are sufficient for an unambiguous position determination.

If the global surveillance system comprises only one camera there should be seven or more markings; having two stationary cameras for stereo view, there should be fife or more markings, although it will work with three markings also; having three stationary cameras or more, three markings are fine, although more markings are better.

In a very preferred embodiment the Delta Robot having no angle encoders but having a global surveillance system as described above and optionally the tilt sensors for the horizontal x-axis and y-axis and/or the multi axis acceleration sensors and/or an IMU as described above. Not using angle encoders in the Delta Robot structure makes the Delta Robot structure cheaper and by that the CMM as a whole. Further it reduces the data to be processed in order to determine the current position of the measurement probe, which is an advantage with respect to processing time and electronic equipment.

In order to increase the speed of data processing the analysing unit and/or the control unit is configured to derive position information by means of sensor fusion. Thereby preferably the data generated by the global surveillance system and/or generated by one or more sensors of the sensor unit are processed. Further, in case the Delta Robot is provided with angle encoders, the signals/data of angle encoders of the delta structure can be processed together with those other signals/data by sensor fusing.

Particularly the analysing unit and/or the control unit are configured to carry out sensor fusion by means of Kalman filters or similar instruments in order to increase the processing speed further.

Usually the analysing unit and/or the control unit are deriving position information from the sensor unit and/or the angle encoders and/or the global surveillance system with a system clock rate. In a preferred embodiment the clock rate the images are taken by the camera is adaptable to said system clock rate, so that for each taken image an accurate position can be given. Thereby, adaptable means the clock rate, images are taken, can be synchronized with the system clock rate, so that each time a position information derives from or is delivered by the sensor unit and/or the angle encoders and/or the global surveillance system, an image is been taken; or the clock rate, images are taken, is coordinated with the clock rate in a way that images are taken only each second or third time or with another defined ratio with respect to a derived or delivered position information.

The control unit is configured as a high performance servo control system with a high control rate. The very fast control enabled by the high performance servo control system allow for making the control stiffer and thus more accurate. It further enables more complex control concepts such as state variable control loop and/or dual-loop control, and it enables integration of a high bandwidth, which facilitates a high clock rate of the process.

In another preferred embodiment the CMM is provided with a distance measurement unit determining the distance between the camera optics and the surface of the target object in order to ensure appropriate focusing.

In another embodiment the same distance measurement unit can be used to determining the dimensions of the target.

The distance measurement system is preferably located at the end effector and is moved together with the camera.

In a preferred embodiment the distance measurement unit is a laser distance measurement unit configured for determine the distance between the optics of the camera and an area of the surface of the target object, where the upcoming picture shall be taken, so that the distance determination is accomplished always before the camera is moved to said area. Thus, the correct focusing with respect to the distance between optics of the camera and the surface of the target object can be ensured during moving the camera to the said area by either adopting the distance by a movement in z-direction or by adopting the camera optics to an amended distance. In cases, where pictures are taken with a clock rate and the camera is moved with a constant speed the determination of the distance can be easily achieved in dependence of the motion speed and clock rate without a huge effort in data processing or programming.

Particularly the camera can be moved in the motion zone with 6 dimensions of freedom. That can be realized by constructing the tool-holder in a way that tools, like the camera can be moved pivotable around the x-axis, y-axis and z-axis or by connecting the tool-holder to the end effector in a way that the tool-holder can be moved pivotable around the x-axis, y-axis and z-axis. Still another option to achieve this is using a Delta Robot like structure as they are known from medical applications; e.g. delta.6® from "force dimension", wherein the end effector can not only be moved in lateral dimensions by the middle jointed arms, but can be pivoted as well.

Thus, the Delta Robot can be described as having a stationary frame supporting a stationary base. The stationary base supports three middle joint arms carrying an end effector with a tool-holder movable with minimum 3 dimensions of freedom and with up to 6 dimensions of freedom. The end effector supports a sensor unit. The sensor unit comprises multi axis acceleration sensors and/or gyroscopes and or tilt sensors and or IMUs and/or at least three markings to be followed by at least two stationary cameras fixed to the stationary frame or stationary base.

In a further embodiment the tool-holder at the end effector of the Delta Robot is configured to accommodate further tools, like cameras with another field of view or another frame rate, optical measurement probes or tactile measurement probes or other tools, like a laser writer for metals, a drill or cutter head et ceterea. The tool-holder can be configured for allowing interchanging those probes and tools and can be provided with an adapter automatically recognizing the probe or tool fixed in the tool holder and by doing so starting the according program for running. The tool-holder further can be formed for accommodating a camera as described above at the end effector and adjacent to a probe or tool as described. The camera thereby can be arranged in a way that the probe or tool is within the field of view of the camera, so that it can be watched by the camera.

As the tool-holder is configured for accommodating various probes, the CMM as described above with the camera as a measurement probe, can be used, e.g. to give a rough analysis of the target object as a preparation of a subsequent measurement with either the same or another camera, an optical or tactile probe or another tool. The preparation can include: ensuring the target object is on the table; ensuring the target object is correctly fixed with the correct span tools; checking, if there are possible obstacles that could cause collisions during measurement execution; finding the program, already stored, that must be used for measurement (auto-detection of the target object to be measured); automatically generating and executing a new program for measuring the main features, without any programming task for the user; getting sufficient information to align the target object and avoid the usual manual steps for alignment; measuring in pallets: that means multiple measurements of the same target object with unknown orientation or of different target objects, e.g. assembled in a support, with unknown orientation and possible unknown number of units.

In a further preferred embodiment the measurement probe is the distance measurement unit configured to deliver data for a three dimensional point cloud (3D point cloud), while the analysing unit is configured to derive the 3D point cloud from said data, so that the spatial surface of the target object can be presented by the 3D point cloud.

In order to create a 3D point cloud, the distance measurement unit comprises a line or array receiving sensor.

It is moved in an "on-the fly"-mode over the target object preferably scanning the surface of the target object.

In case the distance measurement unit is a laser distance measurement unit the laser comprises an optical component configured in a way that the pulsed laser beam can scan the target object along a first line, e.g. in x-direction. Thus, the whole target object can be scanned by moving the distance measurement by means of the end effector over the whole target object not using that optical component in its scan function or it can be scanned by moving the laser distance measurement unit along a second line, e.g. perpendicular to the first line e.g. in y-direction, while the scanner laser sends its pulses along the first line in x-direction. A receiving sensor integrated in the laser distance measurement unit is configured as a line or array sensor preferably intensity sensitive for the incoming reflecting pulses, like e.g. a CCD line or array sensor connected to the analysing unit.

Further, the camera at the end effector can also be used for delivering data for a 3D point cloud, by taking at least two images from different positions, which images are overlapping to at least 50%, and by configuring the analysing unit with according software to derive a 3D point cloud out of those images as it is known in the field of stereo photo-grammetry. Dependent on the embodiment of the CMM the camera takes the images from different positions perpendicular from above the target object (CMM with 3DOF) or the camera takes the pictures from above the target object under different angles (CMM with 6DOF).

Further, the mentioned global surveillance system also can be used to generate data, which are delivered to the analysing unit for deriving a 3D point cloud, as, in some embodiments, 2 or more cameras are available for this purpose. As mentioned, those cameras are oriented to see the marking in the region of the end effector, what also brings the target object in the field of view.

In a further preferred, because very cost efficient embodiment, only one stationary camera belonging to the global surveillance system and the camera arranged at the end effector are provided and the analysing unit is configured to derive a 3D point cloud. In order to generate a 3D point cloud with such an embodiment, the camera at the end effector is moved by the end effector into a position that a stereo view with the stationary camera results of an interesting portion of the target object or of the whole target object. The data generated by the stationary camera and the camera at the end effector are than delivered to the analysing unit and are processed by the analysing unit for deriving a 3D point cloud.

Compared to old systems the preparation for a measurement with an optical probe or a tactile probe is much faster using the new CMM with the camera as described above, as no programming and no calibration is necessary. The use of this CMM is possible for non-trained users also, as no programming steps are necessary: the necessary program being automatically identified or automatically newly programmed. Further, there is no need for a large optics to get the full sight of the target object, which makes the CMM very cost efficient.

The invention will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. The drawings show schematically:

DETAILED DESCRIPTION

Figure 1:
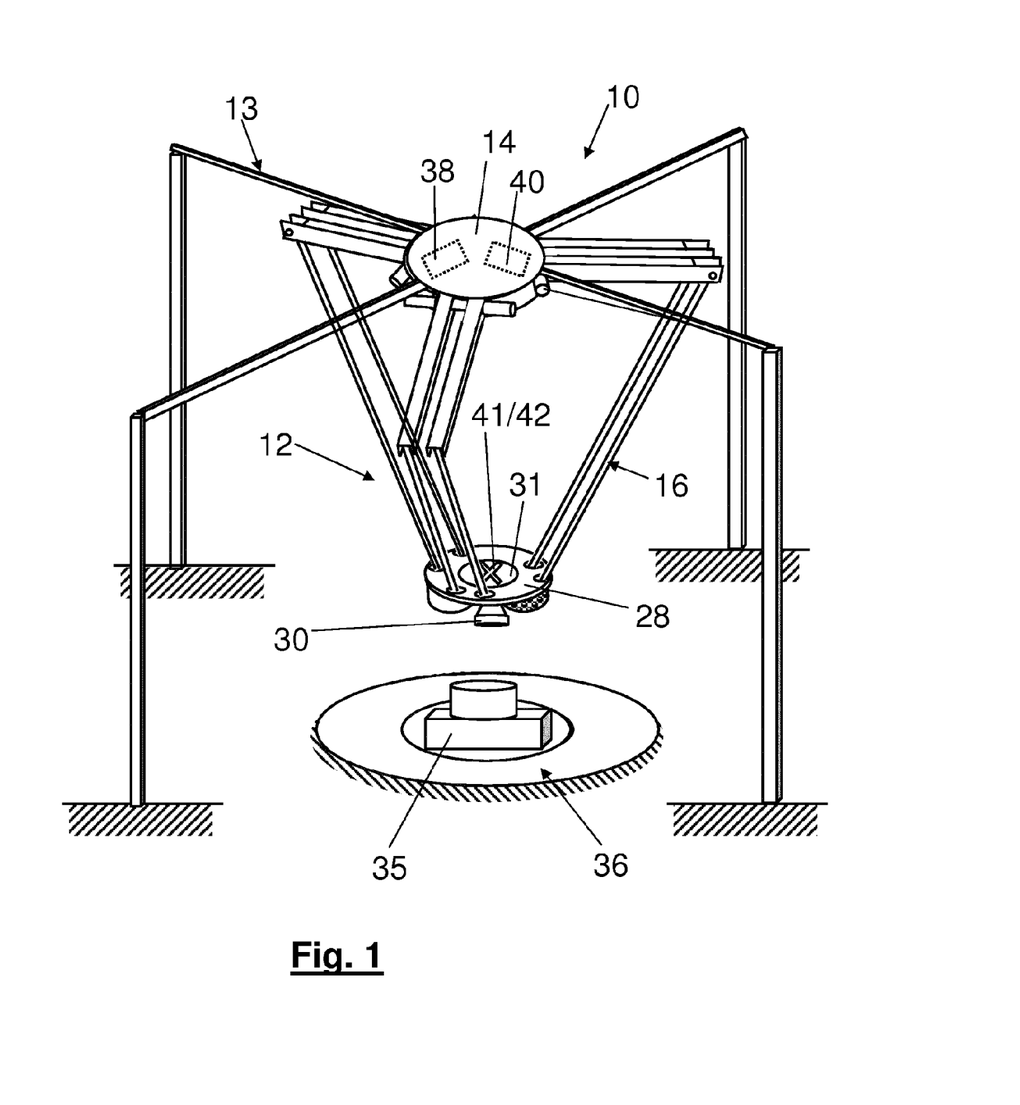
FIG. 1 a first embodiment of a CMM according to the invention.

FIG. 1 shows a coordinate measuring machine CMM 10 according to the invention having a Delta Robot 12 as a supporting structure.

Figure 2:
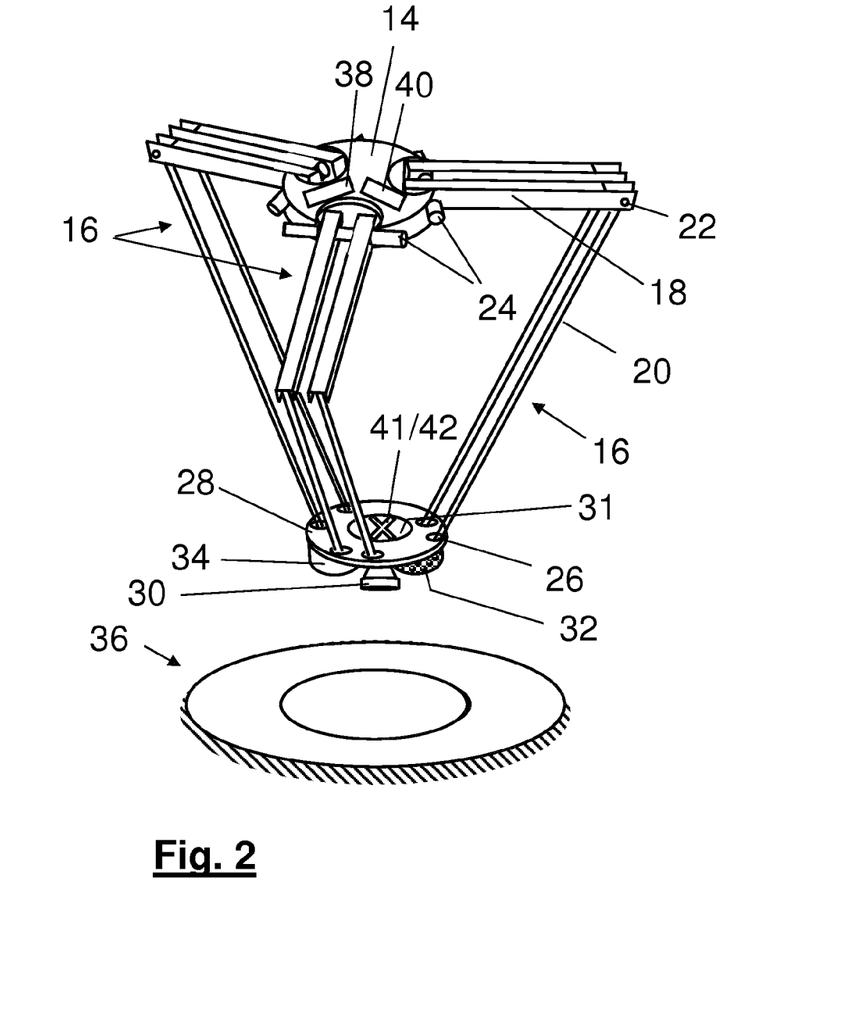
FIG. 2 the CMM of FIG. 1 without the stationary frame.

The Delta Robot 12 comprises a stationary frame 13 supporting a stationary base 14, and three arms 16, also called kinematic chains. The frame 13 is usually a massive construction, but presented here filigree and only schematic in order to show details of the Delta Robot more clearly. In FIG. 2 the Delta Robot is shown without the stationary frame 13 in more details. Each arm has two parts 18, 20, which are linked by a middle joint 22. The first part 18 of each arm 16 is connected by first joints 24 to the stationary base 14 and with their second parts 20 by second joints 26 to an end effector 28. The end effector in this case is built in form of a circle like plate supporting a tool or measurement probe 30', here in form of a camera 30 accommodated in a tool-holder 31, a distance measurement unit 32 and a light source 34 for illuminating a target object 35, which can be placed at a workspace 36 beneath the end effector 28. The tool-holder 31 is configured in a way that the tool or measurement probes, 30, 30' are interchangeable. Further the end effector 28 supports a sensor unit 41 comprising a multi acceleration sensor 42 measuring the acceleration/deceleration actions in horizontal x- and y-directions and in vertical z-direction. Optionally an IMU can be included in the sensor unit. However, this is more important in embodiments having six degrees of freedom (see below).

In this example a control unit 38 and an analysing unit 40 are arranged in the stationary base 14 of the Delta Robot 12. However, the analysing unit 40 can be located externally in a computer as well, which can be connected to the Delta Robot 12 by wired or wireless communication means (not shown). As usual, the joints are provided with angle encoders (not shown) in order to deliver according angle signals, so that the current position of the end effector 28 with the camera 30 can be derived and used by the analysing unit 40 and the control unit 38. The control unit 38 controls the movement of the end effector 28 with the camera within the motion zone having 3 degrees of freedom (lateral in x-, y-, z-directions) by means of actuators (not shown) in a known manner by using the signals/data delivered by the angle encoders and in this example by additionally using the signal/data delivered by the multi acceleration sensor 42. Using the signals of the multi acceleration sensor 42, allows determining the current position of the camera more precisely.

Of course the CMM 10 is, as known in the state of the art, provided with input means (not shown) and with output means (not shown), e.g. in form of a display or monitor and optionally a loud speaker for acoustic warning connected to the analysing unit 40 for presenting the results to the user. Further as known there is an input means for enabling the user to manipulate the CMM 10. Those means can be integrated in the CMM 10, e.g. in the stationary base 14 or they can be built as an external unit (not shown) or integrated in a computer (not shown) and connected to the CMM 10 by wire or wireless in well known manner.

In order to gauge a target object 35 the camera is moved with high speed over the target object and at the interesting positions a picture is taken, whereby illumination with the stroboscopic light with high intensity for a very short time ensures obtaining sharp images in spite of the movement speed. Further, focusing with respect to the distance between the camera optics and the surface to be measured is ensured by determining this distance by means of the distance measurement unit 32, which in this case is a laser distance measurement system based on triangulation.

However, the CMM will work without the distance measurement unit 32 as well, especially if the target objects are knowingly of a geometry without grater discontinuations in the surface to be gauged. For such applications a cheaper CMM of this type without distance measurement unit will be sufficient.

The images are delivered to the analysing unit 40 in the stationary base 14 of the CMM 10 together with the belonging position information derived from the angle encoder signals and the accelerations sensor signals. Than the images are processed in the analysing unit 40, so that a realistic sight of the target object 35 results with the information content the user had selected before.

This information can be, e.g. only pixels having a colour within a distinct range of nano-meters, or pixels having an intensity over or under a distinct threshold, or within a specific intensity range, or image sections showing a specific contrast difference, or image sections along predetermined geometries, e.g. along the outer contour of a target object and further more.

Instead of generating a realistic sight of the target object 35 containing the information the user had selected before, the camera 30 at the end effector 28 can also be used for delivering data for a 3D point cloud of a part of the target object 35, e.g. by taking at least two images from different positions perpendicular from above the target object 35, which images are overlapping to at least 50%, or of the whole target object by taking pictures of the whole target object, which images overlapping to at least 50%, and by configuring the analysing unit 40 with according software to derive a 3D point cloud out of those images as it is known in the field of stereo photogrammetry.

In a further preferred embodiment the measurement probe is the distance measurement unit 32 configured to deliver data for a three dimensional point cloud, wherein the 3D point cloud e.g. can be derived from said data by the analysing unit 40, so that the spatial surface of the target object 35 can be presented by the 3D point cloud.

Figure 3:
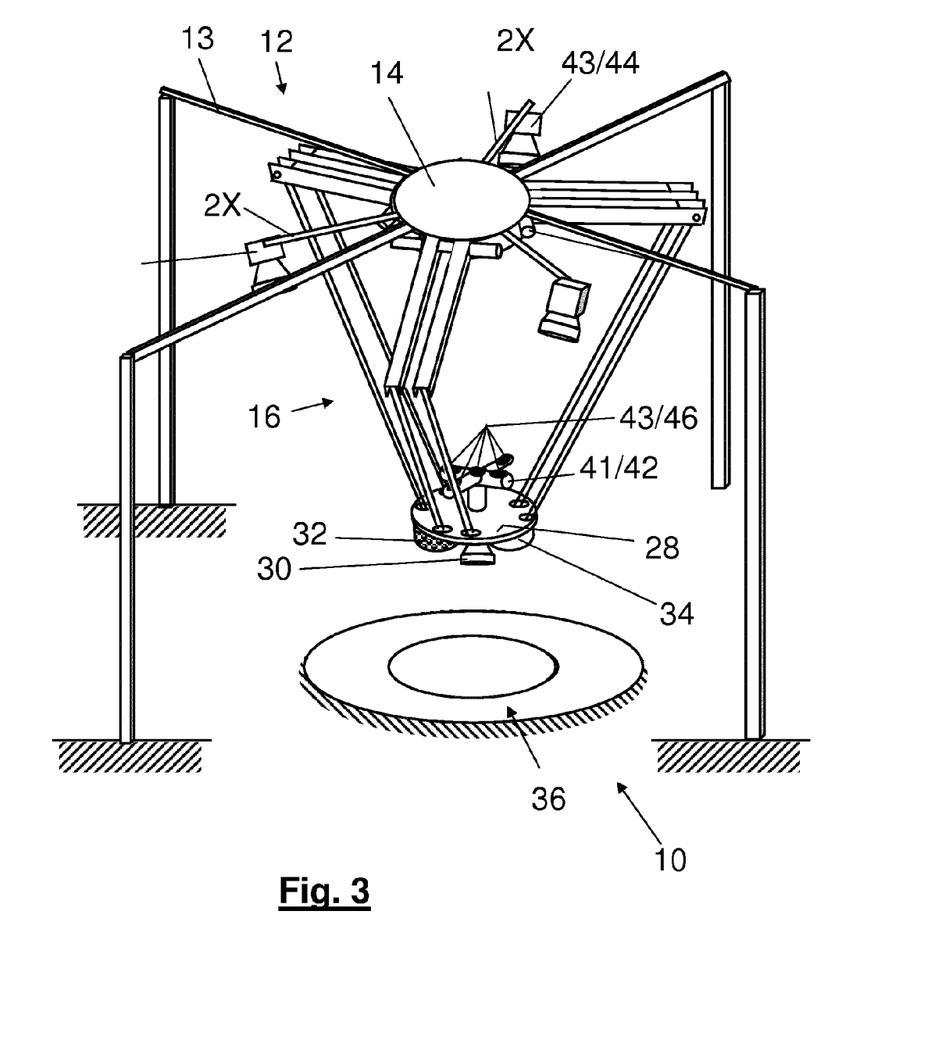
FIG. 3 another embodiment of the CMM.
Figure 4:
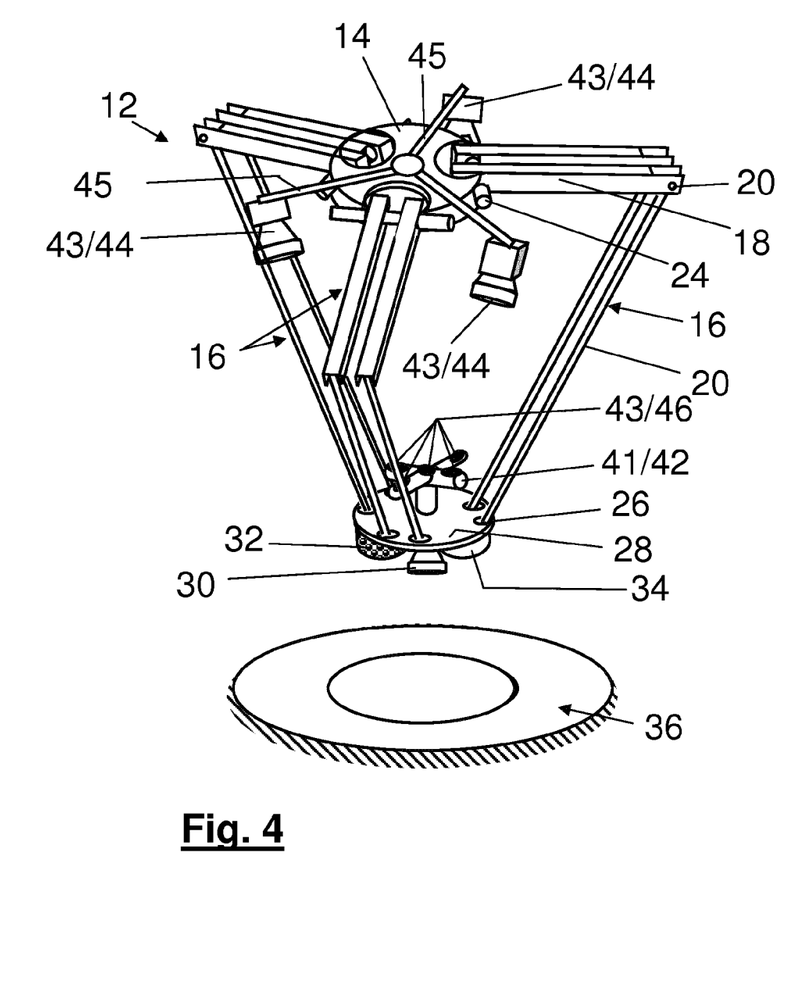
FIG. 4 the CMM of FIG. 3 without the stationary frame.

In FIGS. 3 and 4 a further embodiment of the CMM is shown. In principal this CMM is built analogue to the one shown in FIGS. 1 and 2, but additional to the angle encoders and the acceleration sensor 43 in the sensor unit 41 this CMM is provided with a global surveillance system 43. In this example the global surveillance system 43 comprises three stationary cameras 44 fixed at cantilevers 45 which are supported by the stationary base 14. The cantilevers 45 could of course also be fixed at the stationary frame 13. The global surveillance system 43 comprises further markings which are arranged in the region of the end effector 28/camera 30/sensor unit 41. In this example there are especially fife markings 46 fixed on top of the sensor unit 41.

The markings 46 and the cameras 44 are arranged relatively to each other in a way that each marking 46 is visible at minimum during 80% of the measurement time by at least one camera 44. The stationary cameras 44 each have a field of view encompassing 70% of the motion zone of the end effector 28. In order to enable optimization of the camera positions, in this example the cantilevers 45 can be adjusted in their length in telescopic way and the cameras 44 are fixed by means of universal joints (not shown) to the cantilevers 45. Using the global surveillance system 43 eliminates the inaccuracy of the measurement caused by mechanical clearances and thermal fluctuations.

The camera 30 in this example is a high speed camera able to take more than 500 frames per second (fps) and having a resolution e.g. of between 400'000 and 4'200'000 pixels by image dimensions in the range of 437'664 pixels 752×568 to 4'194'304 pixels 2048×2048, especially 1'048'576 pixels 1024×1024.

For gauging a target object 35 the camera 30 can be moved over the target object with a constant speed of e.g. 0.5 m-1 m per second. Pictures are taken by the camera 30 with a high clock rate, whereby the illumination by means of the light source 34 is controlled to illuminate the surface of the target object 35 with the same clock rate, so that each image will be optimally illuminated. Measuring accelerations and consideration information of the global surveillance system 43 for determining the position of the measuring probe 30 allows the position determination of the measuring probe 30 with high accuracy even at higher measuring frequencies.

Figure 5:
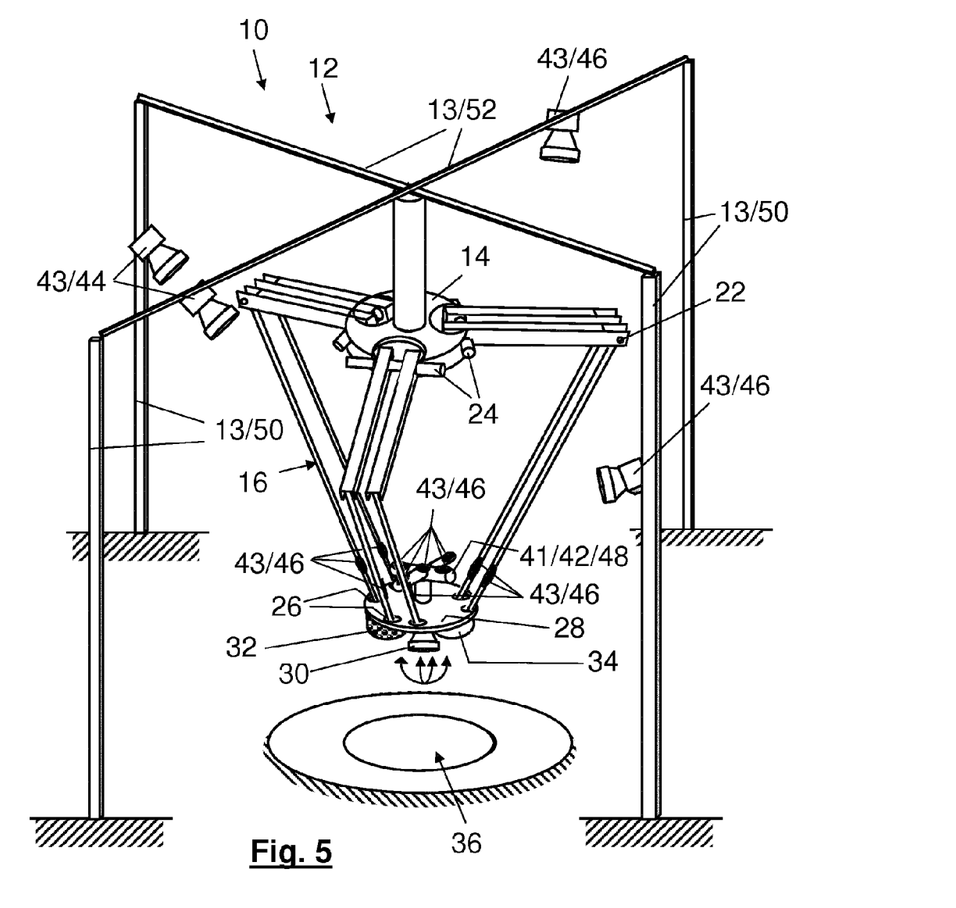
FIG. 5 still another embodiment of the CMM.

In FIG. 5 is a CMM 10 shown very similar to that in FIGS. 3 and 4. However, in this embodiment the camera 30 can be moved in the motion zone with 6 degrees of freedom (DOF), as the end effector 28 can be tilted by an according control of the movement of the arms 16. Another option to realize 6 DOF of the camera 30 would be to fix the camera 30 within the tool-holder 31 pivotable or to connect the tool-holder 31 accommodating the camera 30 to the end effector 28 with a universal joint (not shown). The tilts or pivot motion of the tool-holder 31 or the camera 30 would be controlled by the control unit 31 and actuated by actuators as it is well known. The 6 DOF of the camera 30 enables a camera view not only perpendicular from the top but from various angles at the target object and from the sides at side surfaces of the target object.

The camera 30 at the end effector 28 of this CMM 10 can also be used for generating realistic sights of the target object with selected information content, but as mentioned not only from the top but also from the sides of the target object. Further this camera 30 can also be used for delivering data for a 3D point cloud, as it has been described above, but in this case the images can be taken under different angles from above and from the different sides of the target object 35.

Further, the distance measurement unit 32 can be used for generating data that can be processed by the analysing unit for deriving a 3D point could. The laser distance measurement unit 32 comprises an intensity sensitive line or array sensor (not shown) for receiving the reflected laser pulses. In order to generate those data the laser distance measurement unit 32 can be moved in an "on-the fly"-mode over the target object or it can be pivoted by means of the end effector 28 in a way that the transmitted laser pulses are scanning the target object 35 along a first line e.g. in x-direction and synchronously be moved by means of the end effector 28 along a perpendicular second line, e.g. in y-direction. A further option is to provide the laser distance measurement unit 32 with an optical component configured for deflecting the laser beam in a way that the beam scans the target object along the first line during movement of the laser distance measurement unit 32 by means of the end effector 28 along the second line. Still another option is to configure the optical component of the laser distance measurement unit 32 in a way that the laser beam is deflected in x- and y-direction, so that it can scan the surface of the object from a stationary position without motion of the end effector 28.

The global surveillance system 43 in this example has four stationary cameras 44 which are fixed with universal joints at the stationary frame 13. The stationary cameras 44 are fixed movable along the frame columns 50 and/or the frame cross beams 52.

Further in this embodiment the Delta Robot 12 has no angle encoders connected to the joints 22, 24, 26, but additionally to the multi acceleration sensor 42 there are tilt sensors 48 integrated in the sensor unit 41 measuring the tilt of the end effector 28 and the camera 30 respectively in horizontal x- and y-direction. Using the tilt sensors 48 for measuring tilt around the horizontal x-axis and y-axis allows determining of the current position of the camera more precisely. Preferably this embodiment is provided with an IMU included in the sensor unit.

The control unit 38 in the embodiment is configured as a high performance servo control system with an extremely high control rate typically much more than 1 kHz and up to 200 kHz and the possibility of dual-loop control or state variables control loops.

The arms 16 preferably are controlled by an axis servo control (not shown), which enables an axis control of the arms 16 with an extremely high control rate associated with a high control stiffness. The control unit 38 controls in connection with the axis servo control a high-precision motion trajectory using, e.g. model-based dual-loop control and/or a state variable control loop. For this purpose the control unit 38 uses position information that have been derived by means of data fusion, preferably by means of a Kalman filters, using the data generated by the global surveillance system 43 and at least the acceleration data determined for the end effector 28.

The chosen concept of high performance-control electronic with extremely high control clock rate and model-based dual-loop control enables an extremely dynamic trajectory system. The axis servo-controls enable an axis control with extremely high control clock rate of up to 200 kHz associated with a high stiffness of the controller loop. The main control system in connection with the axis servo-controls controls the high-precision movement trajectory using model-based dual-loop and the absolute position information derived from the set up surveillance system and local acceleration data by means of sensor fusion e.g. by means of Kalman filters.

In order to gauge a target object with this coordinate measuring machine 10 the camera 30 is moved in a "on the fly"-mode over an target object with high speed and high acceleration and deceleration actions as enabled by the Delta Robot structure 12. During the camera 30 movement pictures are taken by the camera 30 from the target object preferably with a constant, high clock rate. The target object is illuminated each time a picture is taken, by using the light source 34 with a stroboscopic light flashing having the same clock rate as the camera 30 for picture taking. The Laser distance measurement unit 32 determines the distance between the optics of the camera 30 and the surface of the target object preferably in dependence of the motion speed of the camera 30 and the clock rate of taking pictures for each immediately upcoming position where a picture shall be taken. The focus of the optics of the camera 30 is than adapted to the determined distance either by moving the camera 30 in vertical z-direction, so that the distance between the surface and optics of the camera 30 are maintained constant, or by adapting the optics of the camera 30 to the determined distance.

Data processing is realized similar as described above, but the position determination is realized by carrying out sensor fusion—using the signals/data delivered from the global surveillance system 43 and the various sensors 42, 48 of the sensor unit 41—preferably by means of Kalman filters or similar instruments—in order to increase the processing speed. The pictures are processed by overlapping or handshaking the taken pictures in order to generate a realistic sight of the whole target object; wherein handshaking means an overlapping of adjacent images by 3% to 6%; overlapping means an overlapping of the images by 8% to 15% unless in special processes, like for generating 3D point clouds (see above), where overlapping can be up to 50%. Thereby only the information selected beforehand by the user is taken from the single images and overlapped or handshaked, so that data volume and processing time is reduced.

As mentioned before, this method can be used as a measuring method per se or before gauging the target object with respect to other information not derivable from the taken images, in order to check the correct position and fixation of the target object and/or obstacles in the trajectories of the measurement probe 30' or in order to program trajectories for the measurement probe. For that purpose the camera 30 can be disassembled from the tool-holder 31 and substitute by another tool 30', like a tactile or optical probe or other tool. Using an according interface in the tool-holder 31 and adapted to an information interface of the tool allows an automatic recognition of the tool, so that automatically suitable software is provided in the analysing unit 40 and the control unit 38.

In a preferred embodiment taking an image with a suitable adjusted focus of the camera 30, registration of the current position of the camera 30 and flash light illumination of the target object 35 are synchronized by means of a trigger bus.

As stated before usually the three arms 16 of the Delta Robot 12 has angle encoders as already known in the state of the art. The signals of said encoders are used by the analysing unit and the control unit, respectively for determining the position of the end effector 28. However, the Delta Robot 12 having the sensor unit 41 at the end effector 28 and the global surveillance system 43 works perfectly without having those angle encoders. Creating a Delta Robot structure 12 without angle encoders makes the structure cheaper and may reduce data processing. But, having a Delta Robot having angle encoders and a sensor unit and/or a global surveillance system 43 can use the information of all the systems to more precisely determine the position of the end effector 28 and the tool in the tool-holder 31.

In cases, where the target objects will predictably have a more even surface, a simpler and cheaper type of an inventive CMM working without a distance measurement unit 32 can be fully sufficient. In those cases a global surveillance system may take over at least partially the function of the distance measurement unit, by analysing the images taking from the target object in relation to the end effector/camera and their position especially with respect to z-direction, also it might be less accurate.

A person skilled in the art can easily recognize which elements shown in the embodiments described above can be combined in a way that makes sense. However, it is not possible to show and describe all possible combinations as a matter of space.

The invention provides an absolute measuring system with 3 to 6 degrees of freedom. It is able to determine the absolute position and orientation of the measurement probe with high accuracy and speed. The direct spatial determination of the absolute position and orientation of the measuring probe by means of the global surveillance system makes a complex calibration of the machine unnecessary, which reduces costs. By using the global surveillance system the influences from mechanical variations and thermal effects are eliminated to a great extend. The direct measurement of the position of the measuring camera removes all unwanted mechanical and thermal influences and thus allows a less expensive construction for the mechanical design of conventional coordinate measuring machines:

Thus, the advantage of the presented invention can easily be summarized as follows:

The considerable effort for the calibration of each machine can be eliminated.

A high speed structure monitoring is possible

The weight of the measuring machine can be reduced compared to classical measuring machines.

Using lightweight technology allows faster movements.

High speed systems based on dual-loop structures allow a stiffer control characteristics, higher accuracy and the active damping of vibrations.

High speed camera sensor modules enable fast optical surveying.

What is claimed is:

1. A coordinate measuring machine comprising:
    a Delta Robot as a support structure having an end effector movable within a motion zone;
    a tool-holder fixed to the end effector configured to accommodate various measurement probes;
    a control unit controlling the motion of the end effector with the tool-holder and the measurement probe within the motion zone and over a possible target object; and
    an analysing unit for processing electronic signals and/or data delivered by the measurement probe;
    wherein the measurement probe is a camera and the signals or data delivered by the measurement probe are images taken by said camera, wherein the camera comprising an optics having a field of view encompassing maximum 20% of a projection the motion zone onto an area,
    wherein the analysing unit comprises a storage device for storing said images and comprising a processor for processing said images, and
    wherein the control unit and the camera are configured for an "on the fly", in the course of which the control unit is configured to move the camera continuously over the target object, and the camera is configured to take pictures only at positions of interest, wherein the pictures are taken without stopping at those positions of interest.

2. The coordinate measuring machine according to claim 1, wherein:
    the analysing unit is configured to carry out image processing—after or during gauging of the target object by means of a camera—to generate a sight of the target object,
    wherein the information content of the sight is selectable by the user and
    wherein the processor generates the sight with the selected information content by means of adding the according information of the images in an overlapping way.

3. The coordinate measuring machine according to claim 1, wherein:
    the camera is a high speed camera and that the CMM having a light source for illuminating the target object in a stroboscopic way each time a picture is taken; wherein the camera is configured for taking pictures with a high clock rate and the clock rate is adaptable to the current movement speed of the camera motion and its field of view.

4. The coordinate measuring machine according to claim 1, wherein:
    the end effector supports a sensor unit, the sensor unit comprises multi axis acceleration sensors or an IMU.

5. The coordinate measuring machine according to claim 1, wherein:
    it comprises a distance measurement unit determining the distance between the camera optics and the surface of the target object in order to ensure focused images, particularly wherein the distance measurement unit is arranged in a way that it is movable together with the end effector.

6. The coordinate measuring machine according to claim 1, further comprising:
    having a global surveillance system comprising at least a stationary camera and at least one marking in the region of the end effector, wherein the stationary camera and the marking are arranged relative to one another in a way that the marking is visible by the stationary camera during at least 80% of the measuring time.

7. The coordinate measuring machine according to claim 6, wherein:
the global surveillance system comprising a stationary camera having an optics with a field of view encompassing at least 30% of a projection of the motion zone onto an area, which is preferably fixed at a stationary base or a stationary frame of the Delta Robot.

8. The coordinate measuring machine according to claim 6 or 7, wherein:
the global surveillance system comprises two stationary cameras and at least fife markings or three stationary cameras and at least three markings.

9. The coordinate measuring machine according to claim 1, wherein:
the Delta Robot comprises three arms, each of them having a first part jointed to a second part, the first parts are connected by first joints to the stationary base and the second parts connected by joints to the end effector, wherein markings of the global surveillance system are arranged in the regions of the second parts of the arms.

10. The coordinate measuring machine according to claim 1, wherein:
the analysing unit and/or the control unit is configured to derive position information by means of sensor fusion, using the data generated by the global surveillance system and/or generated by one or more sensors of the sensor unit and/or wherein sensor fusion is carried out by means of Kalman filters.

11. The coordinate measuring machine according to claim 10, wherein:
analysing unit and/or the control unit are configured for deriving position information from the data delivered by the sensor unit and/or the global surveillance system with a distinct system clock rate and a clock rate with which images are taken by the camera is adaptable to the system clock rate.

12. The coordinate measuring machine according to claim 1, wherein:
the control unit is configured as a high performance servo control system with a high control rate and configured to execute state variable control loop and/or dual-loop control.

13. The coordinate measuring machine according to claim 5, wherein:
the distance measurement unit is configured for determine the distance between the optics of the camera and the surface of the target object in dependence of the motion speed and a clock rate of taking pictures for each upcoming position where a picture is taken.

14. The coordinate measuring machine according to claim 5, wherein:
the distance measurement unit is a laser distance measurement unit, which is configured to deliver data for a three dimensional point cloud, and/or that
the camera is configured to deliver data for a three dimensional point cloud and that the analysing unit is configured to derive the three dimensional point cloud from said data, wherein the distance measurement unit comprises a line or array sensor preferably intensity sensitive for the incoming reflecting pulses.

15. The coordinate measuring machine according to claim 14, wherein:
the laser distance measurement unit comprises an optical component configured to deflect the laser beam variable in one direction in a way that the laser beam scans at least along a first line in this one direction, e.g. in x-direction.

16. The coordinate measuring machine according to claim 1, wherein:
the end effector with the camera is movable in the motion zone with 6 dimensions of freedom.

17. A method for gauging a target object by using a coordinate measuring machine having a control unit and an analyzing unit, comprising:
moving a camera in an "on the fly"-mode continuously within a motion zone over at least a part of an target object with high speed and high acceleration and deceleration actions as enabled by a Delta Robot; and
during the camera movement, taking images of the target object by the camera from positions of interest without stopping the camera movement at those positions of interest, each image encompassing maximum 20% of the motion zone, wherein images are taken in dependence of the movement speed of the camera and in dependence of the encompassed portion of the motion zone in order to enable a processing of the taken images in an overlapping way, so that a sight of the gauged part of the target object is obtainable.

18. The method according to claim 17, wherein:
the analysing unit and/or the control unit derive position information from the sensor unit and/or the global surveillance system with a distinct system clock rate.

19. The method according to claim 17, wherein:
the camera is controlled for taking pictures with a high clock rate and a stroboscopic illumination is coordinated with this clock rate, so that the target object is illuminated each time a picture is taken, wherein the clock rate the images are taken is coordinated or synchronised with the system clock rate.

20. The method according to claim 17, wherein:
a distance between the optics of the camera and the surface of the target object is determined in dependence of the motion speed of the camera and the clock rate of taking pictures for each immediately upcoming position where a picture will be taken, and
the focus of the optics of the camera is adapted to the determined distance either by moving the camera, so that the distance between the surface and optics of the camera are maintained constant, or by adapting the optic of the camera to the according distance.

21. The method according to claim 17, wherein:
the analysing unit is generating a realistic sight of the target object, which already had been gauged or is gauged by the camera,
wherein the information content of the realistic sight is selected beforehand by the user and
wherein the realistic sight with the selected information content is generated by overlapping or handshaking the according information of taken adjacent images.

22. The method according to claim 17, wherein:
the analysing unit and/or the control unit derives position information by means of sensor fusion, particularly using the data generated by the global surveillance system and/or generated by one or more sensors of the sensor unit, preferably by means of Kalman filters.

23. The method according to claim 17, wherein:
the analysing unit receives data from the camera and/or the distance measurement unit and/or the global surveillance system and derives a three dimensional point cloud from those data.

* * * * *